Jan. 29, 1946.        S. G. JOHANSSON          2,393,780
                     ASSEMBLING APPARATUS
                    Filed Nov. 6, 1943        2 Sheets-Sheet 1

INVENTOR
S. G. JOHANSSON
BY
E. R. Nowlan
ATTORNEY

Jan. 29, 1946. S. G. JOHANSSON 2,393,780
ASSEMBLING APPARATUS
Filed Nov. 6, 1943 2 Sheets-Sheet 2
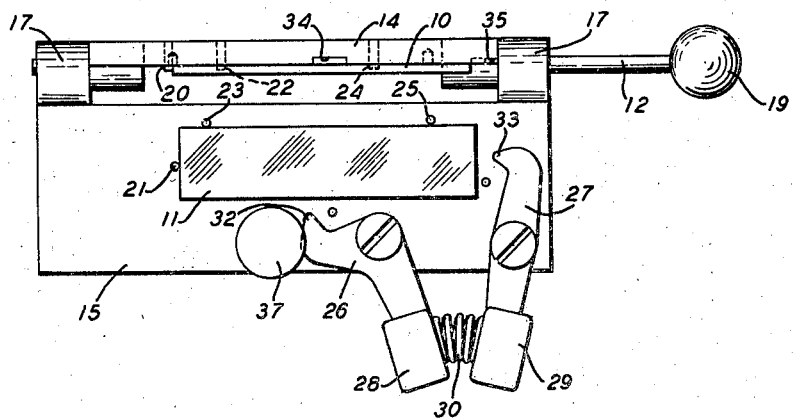
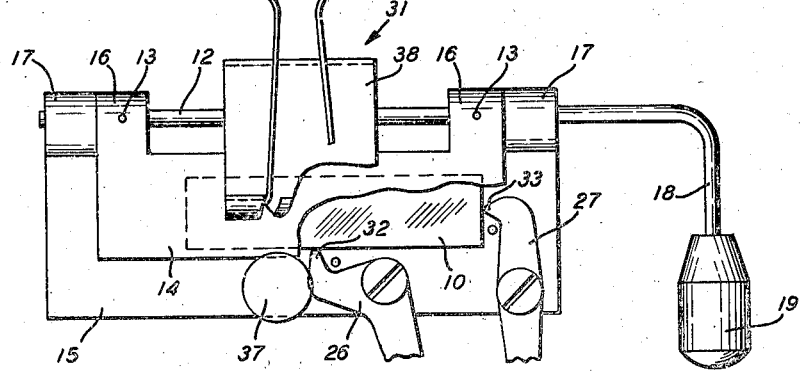
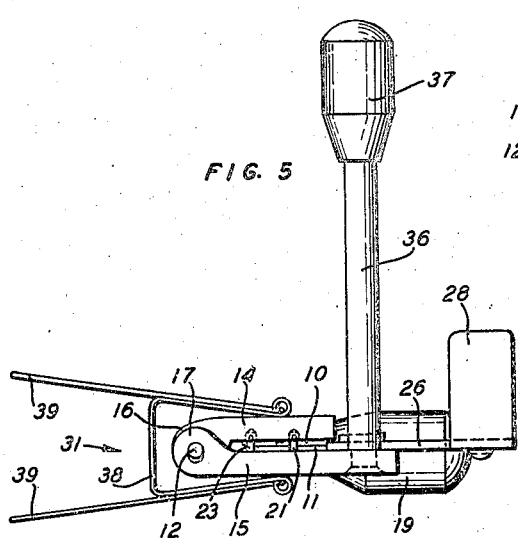
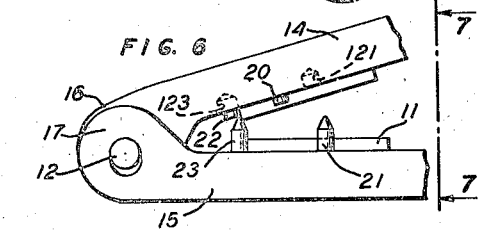
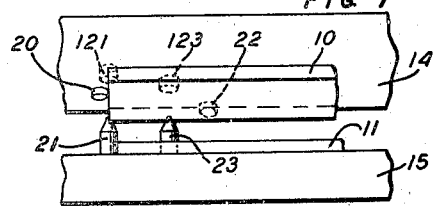
INVENTOR
S. G. JOHANSSON
BY
ATTORNEY Patented Jan. 29, 1946

2,393,780

UNITED STATES PATENT OFFICE 2,393,780

ASSEMBLING APPARATUS

Sven G. Johansson, Cranford, N. J., assignor to Western Electric Company, Incorporated, New York, N. Y., a corporation of New York Application November 6, 1943, Serial No. 509,191

4 Claims. (Cl. 113—99)

This invention relates to assembling apparatus, and more particularly to a device for assembling articles comprising two laminae soldered face to face to each other.

In various recently developed electrical apparatus use is made of certain units each of which comprises two thin, rectangular laminar slices of crystalline quartz each of which is provided upon at least one of its broad sides with an adherent film or coating of metal, and which have apposed, metal coated sides soldered together. The two quartz laminae of such a unit are identically alike in shape and dimensions. In soldering them together to form a unit as described, it is essential that the two laminae be made to register accurately with each other, and that the film of solder between the two metal coated faces of the two laminae be as thin and as uniform as possible.

An object of the present invention is to provide an apparatus for soldering two metal faced laminae together face to face with accurate positioning and orientation of the one lamina with respect to the other.

With the above and other objects in view, the invention may be embodied in an apparatus comprising means for preheating a pair of metal faced laminae positioned side by side and metal face up, melting a soldering alloy on the face of each lamina, spreading the melted solder over the metal faces, folding the two laminae together with the solder coated faces apposed, shifting one lamina on the other into accurate predetermined position and orientation relative to the other lamina, clamping the two laminae together in the predetermined relative positions to maintain the said relative position and to squeeze out excess molten solder from between the two laminae, removing the excess solder, and causing the assembly to cool until the solder remaining between the laminae has set.

Other objects and features will appear from the following detailed description of an embodiment of the invention taken in connection with the accompanying drawings in which the same reference numerals are applied to identical parts in the several figures and in which Fig. 1 is a plan view of an assembling device constructed in accordance with the invention;

Fig. 3 shows the device from the same viewpoint and partly folded;

Fig. 4 shows the device from the same viewpoint and completely folded and clamped;

Fig. 5 is an end view of the showing of Fig. 4;

Fig. 6 is a partial end view on an enlarged scale of the device nearly folded; and Fig. 7 is a view on the line 7—7 of Fig. 6.

Figure 1:
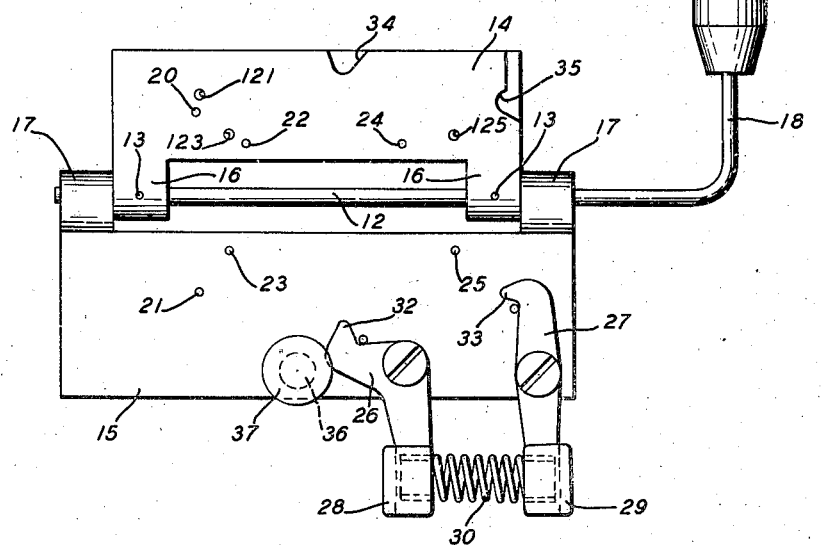

As herein disclosed, the invention is embodied in a device for use in soldering together face to face two identically similar rectangular, metal faced laminae 10 and 11 of quartz. The device comprises two flat, slab-like wings 14 and 15 respectively, connected pivotally together by means of a shaft 12 passing through hinge lugs 16, 16 on the upper wing 14 and hinge lugs 17, 17 on the lower wing 15 and secured rigidly in the wing 14 by pins 13, 13. The shaft 12 is bent to form an integral actuating lever 18 and is provided with a handle 19 preferably of heat insulating material. The perforations in the lugs 17 through which the shaft 12 passes are preferably made slightly oversize as indicated in Figs. 1 and 5, so that there is a small vertical freedom of motion only of one wing with respect to the other transversely of the shaft 12. There is no play of one wing with respect to the other in the longitudinal direction of the shaft.

There are three locating pins in the upper face of each wing as shown in Fig. 1, namely, 20, 22 and 24 in the upper wing 14 and 21, 23 and 25 on the lower wing 15. The pins 20, 22 and 24 serve to locate the lamina 10 in an accurately predetermined position on the wing 14 when an end edge of the lamina is abutted against the pin 20 while a side edge is abutted against the pins 22 and 24. In like manner the pins 21, 23 and 25 serve to locate the lamina 11 on the wing 15.

On the wing 15 are mounted two pivotable positioning levers 26 and 27 lying flat on and pivotable upon the upper surface of the wing. Each of these levers has on its outer end a handle, 28 and 29 respectively, of heat insulating material. A compression spring 30 tends to urge the lever 26 clockwise (Fig. 1) and the lever 27 counterclockwise to press the noses 32 and 33 respectively of the levers against the crystal slice 11 in Fig. 2 and against both slices 10 and 11 in Figs. 4 and 5. The nose 32 bears against the side of the slice opposite the pins 23 and 25 and half way between these, while the nose 33 bears against the end of the slice opposite the pin 21. The wing 14 is formed with clearance recesses 34 and 35 respectively to receive the noses 32 and 33 respectively when the wings are folded together. The wings 14, 15, the lugs 16, 16 and 17, 17 and the shaft 12 are so dimensioned and related that when the wings are folded together as in Figs. 4 and 5, with a pair of crystal slices 10 and 11 positioned between, the wings are mutually parallel and bear evenly over the surfaces of the slices with a slight freedom of motion toward and from each other by virtue of the looseness of the shaft 12 in the lugs 17, 17. The noses 32 and 33 are made thicker than the combined thickness of the two crystal slices together to make sure the upper slice shall not ride over the noses when in the position of Figs. 4 and 5. Hence the need for the recesses 34 and 35. There is also a vertical handling rod 36 rigidly secured to the wing 15 and provided at its upper end with a handle 37 of heat insulating material whereby the whole device may be lifted. Furthermore, removable means generally indicated at 31 are provided to clamp the wings in folded position under spring pressure forcing them together. As shown in Figs. 4 and 5, this means may be an ordinary spring paper clip of familiar commercial form and structure comprising the C-shaped spring clamping member 38 and the releasing levers 39, 39. Preferably also all the parts of the device not otherwise specified are made of metal unwettable by molten solder, e. g., an aluminum alloy, stainless steel, or the like, except the spring 30 which will be of spring steel, brass or the like.

Figure 2:
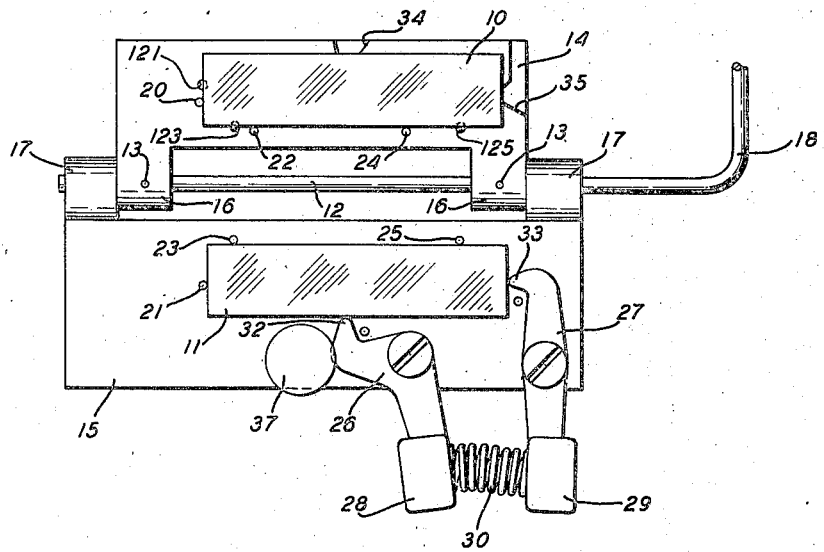
Fig. 2 is a similar view of the device with two laminar elements in place therein.

In operation, the device described with its parts in the position shown in Fig. 1, is placed on a suitable heated supporting plate (not shown), metal coated crystal slices 10 and 11 are placed on the wings and against the positioning pins 20, 21, 22, 23, 24 and 25 as shown in Fig. 2, and the wings and slices are heated thereon to a temperature suitably above the melting point of the solder to be used. When these are suitably hot the wings and slices are brushed or wiped over with a suitable soldering flux, e. g., a preparation of tallow. The flux melts and some of it is drawn by capillary attraction between the under faces of the slices and the top faces of the wings. This provides the adhesion between the slice 10 and the wing 14, which enables the wing 14 to be subsequently folded over on the wing 15 without the slice 10 becoming dislodged from its position on the wing 14.

The various elements being thus suitably hot and covered with molten flux, bits of suitable solder are laid on the upper surfaces of the two slices 10 and 11. When the solder is molten, it is distributed evenly over the slices by being raked with a suitable tool (not shown) which may be merely a bit of bent wire. The handles 28 and 29 are then pinched together, as in Fig. 3, to retract the noses 32 and 33; and the handle 19 is manipulated to fold the wing 14 over through the position shown in Fig. 3 to the position shown in Fig. 4; and the handles 28 and 29 are released. The noses 32 and 33 then return, as in Fig. 4, and press both slices 10 and 11 against the positioning pins and thus into exact registry with each other.

In order to effect this last result, the pins 21, 23 and 25 are about three times as tall above the surface of the wing 15 as the thickness of one lamina 10 or 11 and are cylindrical for two-thirds of their length and roundly pointed over the top third. Since the wings when closed together are to be parallel and spaced apart by a distance substantially equal to the combined thicknesses of the two laminae, the wing 14 is formed with recesses 121, 123 and 125 located to give clearness to the pointed tops of the pins 21, 23 and 25 respectively. The pins 20, 22 and 24, however, are not longer than the thickness of the lamina 10 and need no clearance in the wing 15.

Furthermore, the pin 21 is offset a trifle to the right with respect to the pin 20, not more than half the diameter of the pin 21, so that when the wings are folded together the pin 21 cams the lamina 10 clear of the pin 20 as illustrated in Fig. 6. Also the pins 23 and 25 are further away from the axis of the shaft 12 than the pins 22 and 24 and so cam the lamina 10 clear of the pins 22 and 24. When the wings are closed together, therefore, both laminae are positioned by the noses 32 and 33 against the pins 21, 23 and 25 to make the laminae register with each other.

The slices having been thus apposed together with flux and molten solder between their metal coated faces, the device is picked up from the hot plate by means of the handle 37 and the spring clamp 31 is slipped on as in Figs. 4 and 5 to press the wings and the slices between them firmly together. Under this pressure any excess of molten solder is squeezed out from between the slices and the remainder is squeezed into a film of uniform thickness covering evenly the entire area of both apposed faces of the slices. The clamping pressure is also sufficiently severe so that the entire device may be shaken and whirled by the handle 37 to cause the excess solder to be removed from between the wings. The whole may then be set aside to cool, or may be subjected to a blast of cold air to hasten the cooling. When cold, the clamp 31 is removed and the handle 19 manipulated to open the wings, to permit of removing the slices 10 and 11 which are then firmly and uniformly soldered together in precise mutual registry.

What is claimed is:

1. An apparatus for assembling two metal faced laminae which comprises two wings to support one each of a pair of metal faced laminae, hinge means to connect the two wings, positioning means on each wing to cause the lamina thereon to take a predetermined position relative thereto, means to manipulate one wing to fold the same over upon the other wing with the metal faced surface of the lamina on the one wing apposed against the metal faced surface of the lamina on the other wing, means to adjust the lamina between the two wings into precise predetermined position relative to each other, and means to clamp and hold the apposed and adjusted laminae immovably in position.

2. An apparatus for assembling two metal faced laminae which comprises two wings to support one each of a pair of metal faced laminae, hinge means to connect the two wings and having no relative freedom of motion of the wings thereon along the axis thereof but having relative freedom of motion of one wing with respect to the other wing transversely of the axis of the hinge means, positioning means on each wing to cause the lamina thereon to take a predetermined position relative thereto, means to manipulate one wing to fold the same over upon the other wing with the metal faced surface of the lamina on the one wing apposed against the metal faced surface of the lamina on the other wing, means to adjust the relative position of the two wings and thereby the relative position of the laminae between the wings to bring the two laminae into precise predetermined position relative to each other, and means to clamp the adjusted wings to hold the apposed and adjusted laminae immovably in position.

3. An apparatus for assembling two metal faced laminae which comprises two wings to support one each of a pair of metal faced laminae, hinge means to connect the two wings and having no relative freedom of motion of the wings thereon along the axis thereof but having relative freedom of motion of one wing with respect to the other wing transversely of the axis of the hinge means, positioning pins on each wing to cause the lamina thereon to take a predetermined position relative thereto, means to manipulate one wing to fold the same over upon the other wing with the metal faced surface of the lamina on the one wing apposed against the metal faced surface of the lamina on the other wing, spring pressed noses to bear against the laminae to adjust the relative position of the two wings and thereby the relative position of the laminae between the wings to bring the two laminae into precise predetermined position relative to each other, and means to clamp the adjusted wings to hold the apposed and adjusted laminae immovably in position.

4. An apparatus for assembling two metal faced laminae which comprises two wings to support one each of a pair of metal faced laminae, hinge means to connect the two wings and having no relative freedom of motion of the wings thereon along the axis thereof but having relative freedom of motion of one wing with respect to the other wing transversely of the axis of the hinge means, positioning pins on each wing to cause the lamina thereon to take a predetermined position relative thereto, means to manipulate one wing to fold the same over upon the other wing with the metal faced surface of the lamina on the one wing apposed against the metal faced surface of the lamina on the other wing, a spring pressed nose to bear against both laminae and press the same in a direction parallell to the axis of the hinge means against a positioning pin, a second spring pressed nose to bear against both laminae in a direction transverse to the axis of the hinge means against a positioning pin to thereby adjust the relative position of the two wings and of the laminae between the wings to bring the two laminae into precise predetermined position relative to each other, and means to clamp the adjusted wings to hold the apposed and adjusted laminae immovably in position.

SVEN G. JOHANSSON.